April 6, 1954  R. E. DE KALB  2,674,351
BRAKE SHOE ADJUSTING MEANS
Filed July 29, 1949

4 Sheets-Sheet 1

INVENTOR.
RAY E. DE KALB
BY
Bates Teare and McBean
ATTORNEYS

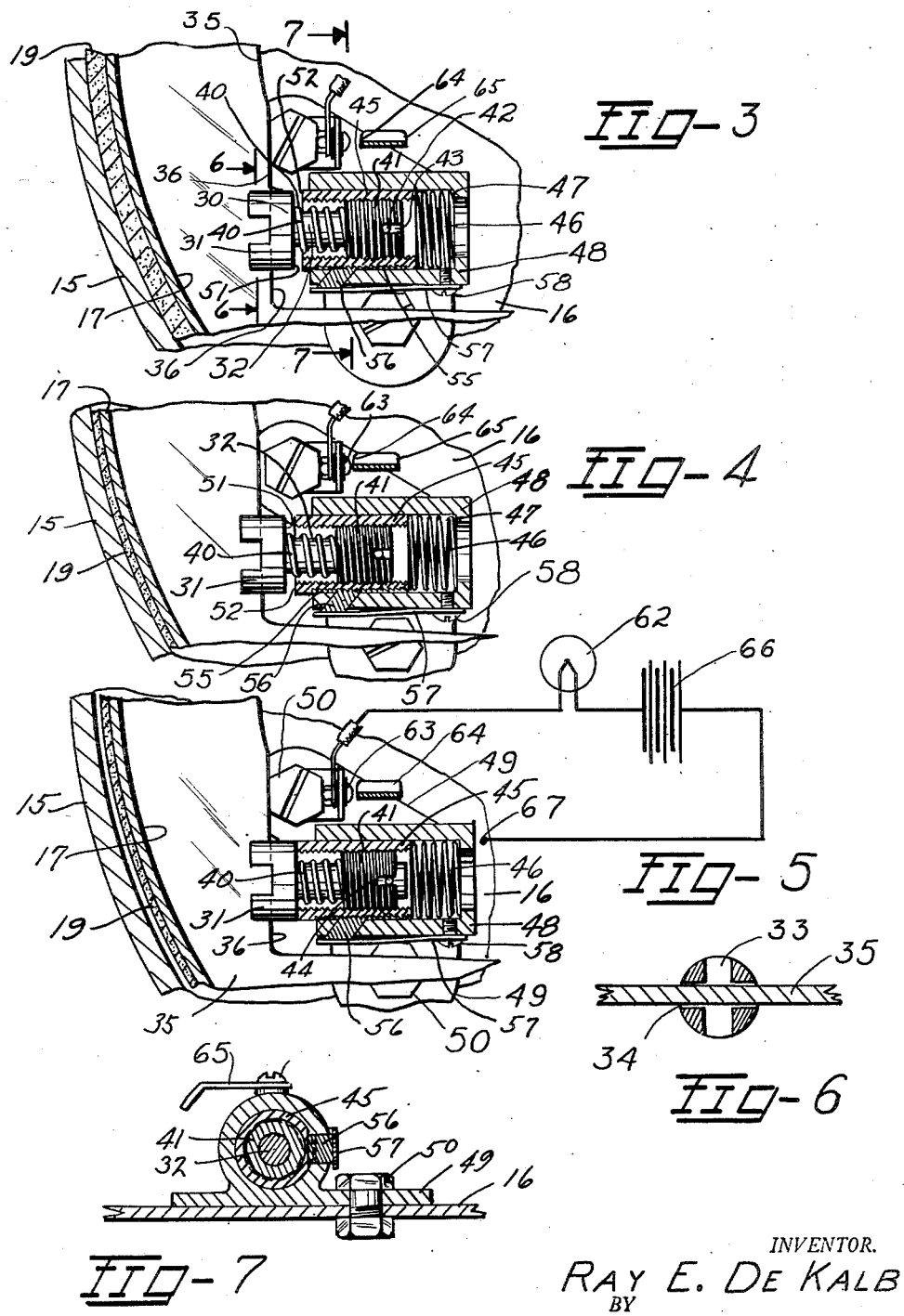

April 6, 1954 R. E. DE KALB 2,674,351
BRAKE SHOE ADJUSTING MEANS
Filed July 29, 1949 4 Sheets-Sheet 3
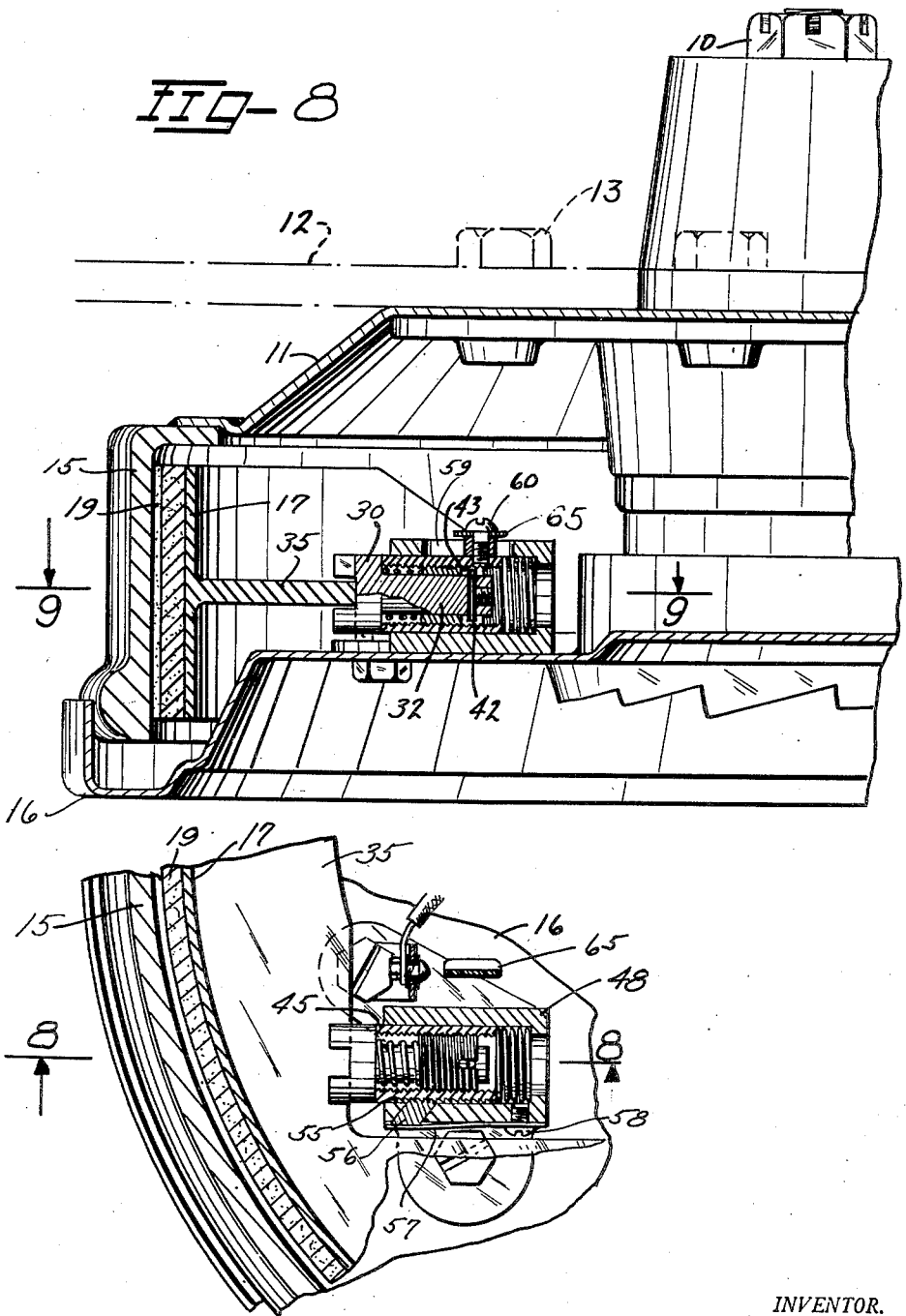
INVENTOR.
RAY E. DE KALB
BY
Bates Teare and McBean
ATTORNEYS April 6, 1954 R. E. DE KALB 2,674,351
BRAKE SHOE ADJUSTING MEANS
Filed July 29, 1949 4 Sheets-Sheet 4
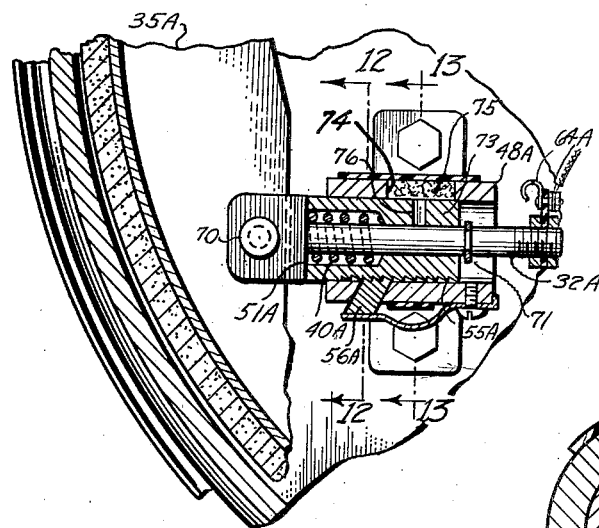
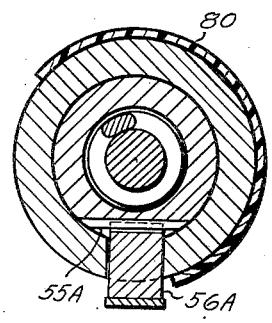
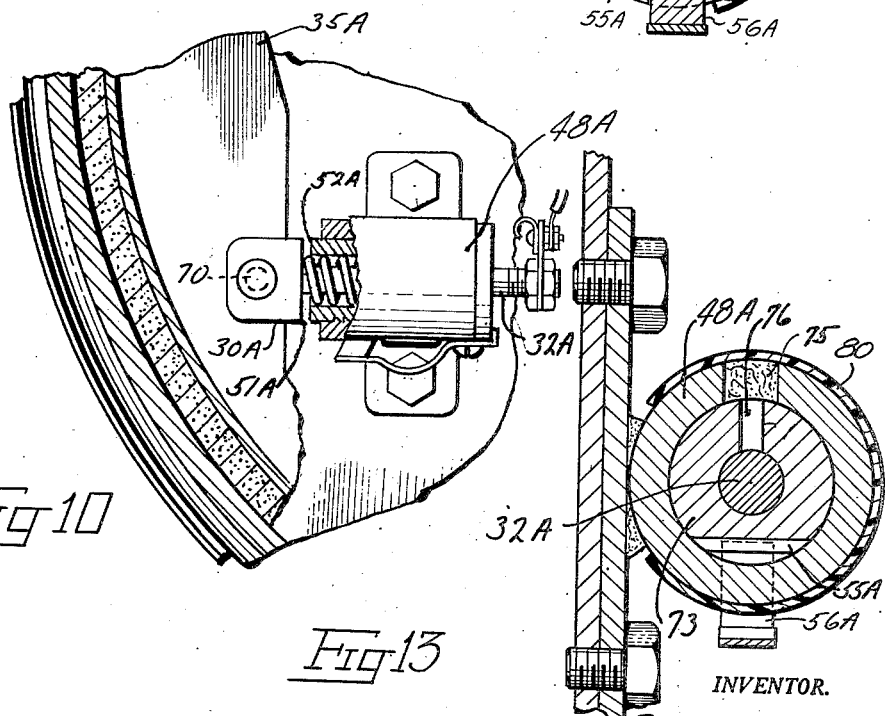
INVENTOR.
RAY E. DE KALB
BY Bates, Peare & McBean
Attorneys Patented Apr. 6, 1954

2,674,351

UNITED STATES PATENT OFFICE 2,674,351

BRAKE SHOE ADJUSTING MEANS

Ray E. De Kalb, Lakewood, Ohio

Application July 29, 1949, Serial No. 107,545

4 Claims. (Cl. 188—79.5)

1

This invention relates to brakes for motor vehicles and particularly to a device for automatically adjusting the brake so as to maintain a clearance within predetermined limits at all times between the liner and drum throughout the life of the liner.

One of the problems involved in the operation of an automatic brake adjusting mechanism is the maintenance at all times of at least a minimum clearance between the liner and drum in the "off" position of the brake, notwithstanding the fact that the automatic mechanism is intended to advance step by step as the liner becomes worn. Such advancement occurs during the time at which the brake is applied and if the take-up mechanism includes a ratchet and pawl, the advancement of one tooth usually occurs while the liner is pressed against the drum thereby resulting in a locking of the liner to the drum and endangering the lives of the vehicle occupants.

An object of the present invention is to utilize the advantages of a mechanical step-by-step take-up mechanism, but to assure a predetermined minimum clearance automatically between the liner and drum over the full range of the take-up mechanism.

An additional object of the present invention is to provide a device which may be readily incorporated in existing brake structures without necessitating extensive changes in the construction thereof, and which is capable of enabling the liner to be renewed in a simple and expeditious manner.

Figure 1:
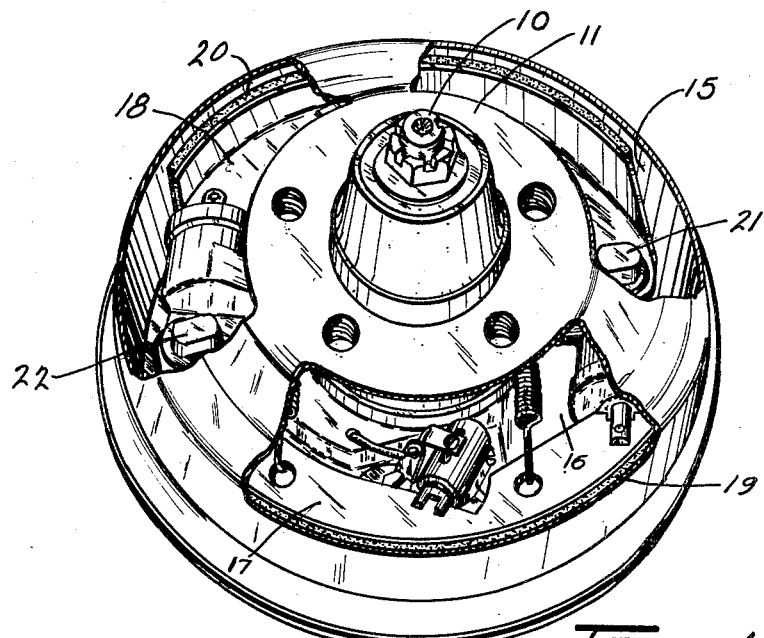
Figure 2:
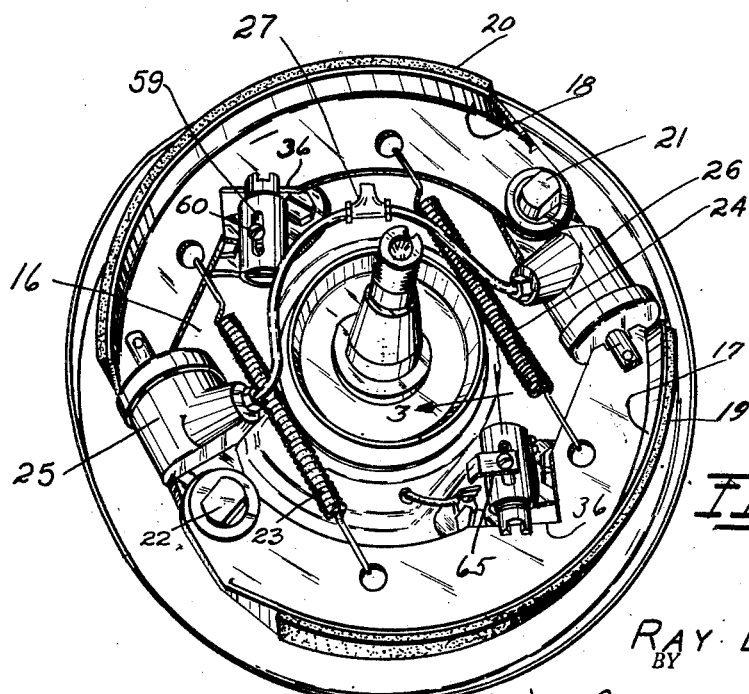

Referring to the drawings, Fig. 1 is a perspective view of a brake assembly with a portion of the drum housing broken away to show the interior construction; Fig. 2 is a perspective view similar to Fig. 1, but with the drum and housing removed; Fig. 3 is a sectional detail view taken on the line 3—3 of Fig. 2 and illustrating the position of the parts when the liner is in contact with the drum; Fig. 4 is a sectional detail view similar to Fig. 3 but showing the liner as having been considerably worn; Fig. 5 is a sectional detail view similar to Fig. 4 but showing the "off" position of the brake with clearance between the liner and drum, and also illustrating diagrammatically a circuit with a signal device therein; Figs. 6 and 7 are sections taken on the correspondingly numbered lines in Fig. 3; Fig. 8 is a view showing a section of my device taken on a plane indicated by the line 8—8 in Fig. 9; Fig. 9 is a sectional view taken on a plane indicated by the line 9—9 in Fig. 8; Fig. 10 is

2 a side view partly in section, similar to Fig. 9, but showing a modified form of the invention; Fig. 11 is a sectional view through the device of Fig. 10 but showing the brake in the "off" position, and Figs. 12 and 13 are sectional views taken on planes indicated by the correspondingly numbered lines in Fig. 11.

The present invention is shown in connection with the rear wheel of a passenger automobile in which 10 indicates the axle and 11 indicates a housing to which a wheel 12 may be attached, as by securing members 13. The housing has a drum 15 and encloses the brake mechanism which includes a customary non-rotatable support 16. In the form illustrated, such mechanism comprises a pair of shoes 17 and 18 which carry liners 19 and 20 respectively in the usual way. Each shoe is pivotally connected to the support 16, as indicated at 21 and 22 respectively, and the shoes are normally urged to the "off" position by springs 23 and 24, respectively. The brakes are adapted to be moved to the "on" position by hydraulic devices indicated in general at 25 and 26, respectively, each of which comprises a cylinder which is mounted upon the support and carries a piston that is operatively connected to one of the shoes. The brakes may be applied by fluid pressure which enters the respective cylinders through a conduit 27 upon depression of the foot pedal by the operator in the customary manner.

My invention contemplates the adaptation of a device for each shoe, for automatically maintaining a predetermined minimum clearance between the liner and drum throughout the life of the liner, and in the embodiment of Figs. 1 to 5, each device includes a member 30 designated as a follower which has a head 31 and a shank 32. The head may be cross-slotted as at 33 and 34 (Fig. 6) to receive the web 35 of a shoe. The follower is supported for reciprocation with respect to the support and is urged into engagement with an edge 36 of the web which extends substantially normal to the axis of the shank. This may be accomplished by providing a recess in the normal web, as is shown in Fig. 2.

To urge the follower into engagement with the shoe, I have shown a spring 40, one end of which bears against the head while the other end bears against one end of a sleeve 41 which in the form of Fig. 3 is non-rotatively connected to the shank 32 by means of a pin 42. The pin extends into a slot 43 in the sleeve so as to permit limited axial movement of the shank with relation to the sleeve. The outer end of the sleeve 41 is shown as being in threaded engagement with an internally threaded sleeve 45, the forward end 52 of which acts as an abutment or stop for the head of the follower, whenever the brake is released. A spring 46 having one end thereof bearing against the rearward end of the sleeve 45 and the other end bearing against a shoulder 47 on the housing or guide 48 operates to urge the sleeve 45 outwardly toward the shoe. The housing may have feet 49 which are attached to the support by bolts 50.

Retraction of the sleeve 45 under the influence of the springs 23 and 24 is limited by having a positively acting device such as a ratchet and pawl, which is arranged to allow the sleeve to be advanced progressively as the liner becomes worn. In Figs. 1 to 9, the sleeve 45 is shown as having ratchet teeth 55 thereon extending along the outer portion of one side thereof, and as being adapted to be engaged by a pawl 56 which is movable into and out of engagement with the ratchet teeth through an aperture in the wall of the housing 48. A leaf spring 57 operates to urge the pawl inwardly into engagement with the ratchet and has its opposite end attached to the housing by a securing member 58.

The total force exerted by the springs 40 and 46 is less than the force exerted by the springs 23 and 24, hence, when the brake is in the "off" position, the rear face of the follower head is held in engagement with the leading edge 52 of the sleeve 45, as is shown for example, in Figs. 5 and 9. At such time the distance between the pin 42 and the shoulder 44 in the slot 43 is equal to the desired minimum clearance between the liner and drum whenever the pawl 56 is acting on the ratchet teeth 55 to hold the sleeve 45 against retrograde movement. The clearance increases progressively as the liner becomes worn until the ratchet is advanced a distance of one tooth, whereupon the clearance drops back automatically to the aforesaid minimum for which the device has been set.

To prevent rotation of the sleeve 45 with respect to the housing, I have shown the housing as having a slot 59 in the upper portion thereof (Fig. 8) and I have shown a screw member 60 as extending through the slot and in threaded engagement with the sleeve. This maintains the ratchet teeth in the same angular position with respect to the teeth on the pawl, and yet allows reciprocation of the sleeve for the intended purpose.

In practice, assuming that a liner of full thickness is affixed to the shoe, then the distance between the pin 42 and the shoulder 44 is set so as to be equal to the desired minimum clearance between the liner and drum in the "off" position of the brake when the face 41 of the follower head is in contact with the face 52 of the sleeve 45. This is accomplished before the final assembly is made by rotating the sleeve 41 within the sleeve 45 until the proper clearance is attained. At such time, the pawl teeth are in abutting engagement with the radial faces of the ratchet teeth (Fig. 9). The loading on the spring 40 exceeds that of the spring 46, hence as the brake is applied, the liner moves toward the drum and the follower moves forwardly with the shoe under the force of the spring 40, while the sleeve 45 remains stationary. The liner engages the drum at substantially the same time at which the pin 42 engages the shoulder 44 in the slot 43. The same action as aforesaid occurs initially each time that the brake is applied, but as the liner becomes worn the shoe can be moved forwardly a correspondingly increased distance. During such increase of movement—and after the follower head has moved its allotted distance forwardly with relation to the sleeve—the follower, the sleeve 41 and the sleeve 45 are moved forwardly as a unit by the spring 46. If such forward movement is less than the pitch of the teeth on the ratchet, then upon release of the brake, the follower, the sleeve 41 and the sleeve 45 are moved as a unit rearwardly until a radial face of the ratchet abuts against the pawl, thereby arresting further rearward movement of the sleeves 45 and 41. Continuation of the releasing operation compresses the spring 46 until the face 51 of the follower engages the forward edge of the sleeve 45.

If the liner becomes worn to such an extent that the forward movement of the unit exceeds the pitch of the ratchet teeth, then the pawl drops automatically behind the next tooth thereby diminishing the allowable amount of return movement of the unit. Such action usually occurs while the liner is pressed against the drum, but in view of the fact that at that time there is a predetermined clearance between the rear face of the follower head and the forward edge of the sleeve 45, the liner can always be withdrawn from the drum by an amount equal to such clearance. As stated aforesaid, the clearance is the minimum amount initially determined for satisfactory operation of the brake, and for passenger vehicles, the clearance is usually of the order of .010 inch.

The foregoing cycle of movement is repeated automatically and the ratchet is advanced step-by-step progressively as the thickness of the liner becomes diminished, until replacement is necessary.

My invention contemplates the provision of a signal which will indicate to the operator the necessity for replacing the brake lining. Such signal may comprise a lamp which is placed upon the instrument panel and is caused to be illuminated whenever the sleeve 45 has advanced sufficiently to close a contact in an electric circuit. This may be accomplished by employing an electric circuit which includes a lamp 62, a source of power 66, a stationary contact 63 and a movable contact 64 which may be attached to the movable sleeve 45 by means of an arm 65 as shown in Figs. 2 and 7. The circuit is shown as having one end grounded to the support at 67, it being understood that the contact 63 is suitably insulated from the support so as to enable the circuit to be closed whenever the contact 64 engages the contact 63.

In Figs. 10 to 13, I have shown a modification of the invention wherein the follower 30A is pivotally connected to the shoe by a pin 70. The shank 32A of the follower extends through a sleeve 73 and is slidably mounted therein, while the sleeve in turn is slidably mounted in the housing 48A. A spring 40A surrounds the shank and is positioned within a recess 74. It operates to separate the follower head from the sleeve upon the initial movement of the shoe during the application of the brake. The amount of such separation is determined by the distance between the rearward face of the sleeve and an abutment 71 on the follower shank. In the preferred form, the abutment comprises a snap ring which is applied to a groove in the shank. The sleeve 73 has ratchet teeth 55A which are adapted to be engaged by a pawl 56A, the latter of which is biased to engaging position by a spring 57A. Lubrication for this unit may be supplied from an oil-soaked pad 75 through an oil-hole 76, and the pad may be protected by a guard 80 which may comprise a flexible covering of any suitable polymeric material.

In the modification, the follower is pulled forwardly by the shoe and is separated from the sleeve 73 during the initial movement until the abutment 71 strikes the rear face of the sleeve. Continued forward movement of the shoe pulls the follower and sleeve as a unit with respect to the housing until the wear on the liner causes the ratchet to advance one tooth. Inasmuch as such action occurs while the liner is pressed against the drum, the sleeve is held against retrograde movement, but the liner can be withdrawn from the drum by virtue of the clearance which exists between the follower head and the forward end of the sleeve whenever the brake is applied as is shown in Fig. 10.

The signal mechanism for indicating the need for replacement of the liner in the modification may have the movable contact member 64A mounted on the rearward end of the follower shank, while the stationary contact member may comprise the housing 46A. In this case a grounded circuit, which is well known in the art, may be used for effecting illumination of the lamp indicated at 62 in the circuit of Fig. 5.

An important advantage of the present invention is that the brake liner is adjusted progressively and automatically through the medium of a ratchet mechanism without "freezing" the liner to the drum consequent upon the occurrence of an advancement of the ratchet while the liner is pressed against the drum. A further advantage is that the unit is sufficiently compact as to be readily applicable to existing brake structures without the need for extensive changes in the construction thereof. In operation, the liner always has a predetermined minimum clearance with the drum and has a maximum allowable clearance which is governed by the pitch of the ratchet teeth. In practice, the pitch of the teeth is of the order of .025 inch, which has been found to be adequate to permit advancement of the ratchet teeth within the allowable range of movement of the usual foot controlled lever. The invention facilitates the even actuation of all brakes, even though one liner may be worn more than another. Moreover, the operator has ample warning of the need for lining renewal before the drum is apt to become scored.

I claim:

1. An automatic brake adjusting device adapted for use in a brake assembly having a rotatable drum, a non-rotatable support, and a brake shoe mounted on the support and carrying a liner which is adapted to engage the drum, said device comprising a guide carried by the support, two members telescopically mounted for reciprocation within the guide, the inner member being adapted to engage and to be moved with the shoe, a spring acting between the members to move one with relation to the other, adjustable stop means within the housing cooperating with said members to limit the extent of said relative movement, and a second spring acting on the outer member and the guide and operating to move the outer member progressively as the liner becomes worn.

2. An automatic brake adjusting device comprising in combination, a guide adapted to be fixed to a non-rotatable support, a sleeve slidably mounted within the guide, the sleeve being internally threaded, a brake shoe follower extending into the sleeve, a member in threaded engagement with the sleeve and having a pin and slot connection with the follower, a ratchet carried by the sleeve and a pawl carried by the guide and adapted to engage the ratchet.

3. An automatic brake adjusting device comprising in combination, a guide adapted to be fixed to a non-rotatable support, a sleeve slidably mounted within the guide, a ratchet on one side of said sleeve, said guide having an oblique opening through the wall thereof, a pawl movable within said opening and adapted to engage the ratchet, a leaf spring carried by said guide and having its free end engaging the pawl to urge it toward the ratchet, an axial slot through the guide opposite the ratchet, a screw member extending through the slot in threaded engagement with the sleeve, a shoe follower slidably mounted within the sleeve, a spring acting against the follower and sleeve and tending to separate them, and an adjustable stop device associated with the follower and sleeve within the guide for limiting the extent of said separation.

4. An automatic brake adjusting device adapted for use in a brake assembly having a non-rotatable support, a rotatable drum, and a brake-shoe having a liner and adapted to be positioned by an independent braking force into engagement with the drum, said attachment comprising a guide, means for removably securing the guide to the support, a member mounted for reciprocation within the guide in the direction of brake-shoe movement, pawl and ratchet means interconnecting the guide and member for step-by-step advancement in the direction of brake-shoe movement, a second member mounted for reciprocation in the same direction within the first member, operating means adjustably coacting between said members to separate and urge said second member into following engagement with the shoe independent of the applied braking force during the initial portion of the brake-shoe movement, and means coacting between said members after predetermined separation to move them in the direction of brake-shoe movement in unison during the remaining portion of the shoe movement.

References Cited in the file of this patent

UNITED STATES PATENTS

| Number | Name | Date |
|---|---|---|
| 480,982 | Wohlfarth | Aug. 16, 1892 |
| 625,849 | Price | May 30, 1899 |
| 1,453,050 | Link | Apr. 24, 1923 |
| 1,536,393 | Hellmann et al. | May 5, 1925 |
| 1,644,378 | Hirschler | Oct. 4, 1927 |
| 1,866,248 | Cataudella | July 5, 1932 |
| 2,078,703 | Wisniewski | Apr. 27, 1937 |
| 2,175,446 | Rasmussen et al. | Oct. 10, 1939 |

FOREIGN PATENTS

| Number | Country | Date |
|---|---|---|
| 735,701 | France | Nov. 14, 1932 |
| 472,103 | Great Britain | Sept. 16, 1937 |
| 588,035 | Great Britain | May 13, 1947 |